United States Patent
Chen et al.

(10) Patent No.: US 12,475,374 B2
(45) Date of Patent: Nov. 18, 2025

(54) IMAGE PROCESSING METHOD, ELECTRONIC DEVICE AND STORAGE MEDIUM

(71) Applicant: HON HAI PRECISION INDUSTRY CO., LTD., New Taipei (TW)

(72) Inventors: I-Hua Chen, New Taipei (TW);
Tung-Tso Tsai, New Taipei (TW);
Guo-Chin Sun, New Taipei (TW);
Tzu-Chen Lin, New Taipei (TW);
Wan-Jhen Lee, New Taipei (TW);
Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 1149 days.

(21) Appl. No.: 17/386,326

(22) Filed: Jul. 27, 2021

(65) Prior Publication Data

US 2022/0036192 A1    Feb. 3, 2022

(30) Foreign Application Priority Data

Jul. 28, 2020    (CN) .......................... 202010740717.5

(51) Int. Cl.
*G06N 3/082* (2023.01)
*G06F 18/21* (2023.01)

(52) U.S. Cl.
CPC ........... *G06N 3/082* (2013.01); *G06F 18/217* (2023.01)

(58) Field of Classification Search
CPC ........ G06N 3/082; G06N 3/063; G06N 3/045; G06F 18/217; G06F 18/241; G06V 10/454; G06V 10/82
See application file for complete search history.

(56) References Cited

U.S. PATENT DOCUMENTS 12,067,373 B2 *   8/2024   Gope ..................... G06N 3/063
2018/0136912 A1 * 5/2018   Venkataramani ...... G06N 3/048
(Continued)

FOREIGN PATENT DOCUMENTS

CN    108304921     7/2018
WO    2020039493    2/2020

OTHER PUBLICATIONS

Mocerino L, Calimera A. Fast and accurate inference on microcontrollers with boosted cooperative convolutional neural networks (bc-net). IEEE Transactions on Circuits and Systems I: Regular Papers. Dec. 1, 2020;68(1):77-88. (Year: 2020).*

*Primary Examiner* — Oluwatosin Alabi
(74) *Attorney, Agent, or Firm* — ScienBiziP, P.C.

(57) ABSTRACT

An image processing method and an electronic device are disclosed, the method acquires training data in response to receiving an image processing instruction and trains a deep learning model with the training data by using a preset deep learning framework to obtain an initial model. A data type of the initial model is converted to increase the data processing speed of the model. A correction layer is added to the converted initial model and the initial model is optimized by training weights of the correction layer to obtain an image processing model to further increase the data processing speed. After acquiring an image from the image processing instruction, the image processing model can be used to process the image and an image processing result can be outputted. The image is processed based on the optimized image processing model, and the data processing speed and accuracy are guaranteed.

11 Claims, 2 Drawing Sheets

(56) References Cited

U.S. PATENT DOCUMENTS

2020/0090383 A1\* 3/2020 Dwivedi ............... G06T 11/006
2020/0193274 A1\* 6/2020 Darvish Rouhani ... G06F 17/15
2021/0174214 A1\* 6/2021 Venkatesan ............. G06N 3/08

\* cited by examiner

IMAGE PROCESSING METHOD, ELECTRONIC DEVICE AND STORAGE MEDIUM

FIELD

The present disclosure relates to a technical field of artificial intelligence, specifically an image processing method, an electronic device and a storage medium.

BACKGROUND

The original deep learning framework Convolutional Architecture for Fast Feature Embedding (Caffe) only supports single-precision floating-point (float) data types and double-precision floating-point (double) data types, and most of the training, testing, and application processes are completed based on the float data type.

However, for some large networks, use of the float data type is time-consuming and memory-intensive, especially in embedded devices, many networks cannot even be used directly.

Therefore, achieving a balance between data processing speed and accuracy is an urgent technical problem to be solved.

SUMMARY

In view of the above, it is necessary to provide an image processing method, an electronic device and a storage medium, which can perform image processing based on an optimized image processing model while ensuring data processing speed and accuracy.

A first aspect of the present disclosure provides an image processing method, the method includes: acquiring training data in response to receiving an image processing instruction; training a deep learning model with the training data by using a preset deep learning framework to obtain an initial model; converting a data type of the initial model; adding a correction layer to the converted initial model; optimizing the initial model by training weights of the correction layer to obtain an image processing model; acquiring an image from the image processing instruction; using the image processing model to process the image and output an image processing result.

In some embodiments, the method of converting a data type of the initial model includes: acquiring demand data from the image processing instruction; determining a target data type according to the demand data; converting a data type of the initial model into the target data type.

In some embodiments, the method of determining the target data type according to the demand data includes: determining a required speed of data processing and a required accuracy according to the demand data; determining that the target data type is int8, when the required speed of data processing is greater than or equal to a preset speed; determining that the target data type is half-precision, when the required accuracy is greater than or equal to a preset accuracy.

In some embodiments, a speed of data processing of the model with the int8 data type is higher than that of the model with the half-precision data type, and an accuracy of the model with the int8 data type is lower than that of the model with the half-precision data type.

In some embodiments, the method of optimizing the initial model by training weights of the correction layer to obtain an image processing model includes: training weights of the correction layer by fixing weights of each layer in the initial model; when an accuracy of the initial model is greater than or equal to a preset threshold, stopping the training to obtain the image processing model.

In some embodiments, the method of optimizing the initial model by training weights of the correction layer to obtain an image processing model further includes: training the weights of the correction layer with full accuracy data type to obtain the image processing model.

In some embodiments, the image processing method further includes: constructing a validation data set and verifying the image processing model with the validation data set.

A second aspect of the present disclosure provides an electronic device, the electronic device includes a memory and a processor, the memory stores at least one computer-readable instruction, and the processor executes the at least one computer-readable instruction to implement the method. Thus training data is acquired in response to receiving an image processing instruction; a deep learning model is trained with the training data by using a preset deep learning framework to obtain an initial model; a data type of the initial model is converted and a correction layer is added to the converted initial model; the initial model is optimized by training weights of the correction layer to obtain an image processing model; an image is acquired from the image processing instruction and the image processing model is used to process the image and output an image processing result.

A third aspect of the present disclosure provides a non-transitory storage medium having stored thereon at least one computer-readable instructions that, when the at least one computer-readable instructions are executed by a processor, implement the following steps: acquiring training data in response to receiving an image processing instruction; training a deep learning model with the training data by using a preset deep learning framework to obtain an initial model; converting a data type of the initial model; adding a correction layer to the converted initial model; optimizing the initial model by training weights of the correction layer to obtain an image processing model; acquiring an image from the image processing instruction; using the image processing model to process the image and output an image processing result.

The image processing method, the electronic device, and the non-transitory storage medium of the present disclosure perform image processing based on an optimized image processing model while ensuring data processing speed and accuracy.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Optionally, the image processing method of the present disclosure is applied to one or more electronic devices. The electronic device includes hardware such as, but not limited to, a microprocessor and an Application Specific Integrated Circuit (ASIC), Field-Programmable Gate Array (FPGA), Digital Signal Processor (DSP), embedded devices, etc.

The electronic device may be a device such as a desktop computer, a notebook, a palmtop computer, or a cloud server. The electronic device can interact with users through a keyboard, a mouse, a remote control, a touch panel, or a voice control device.

Figure 1:
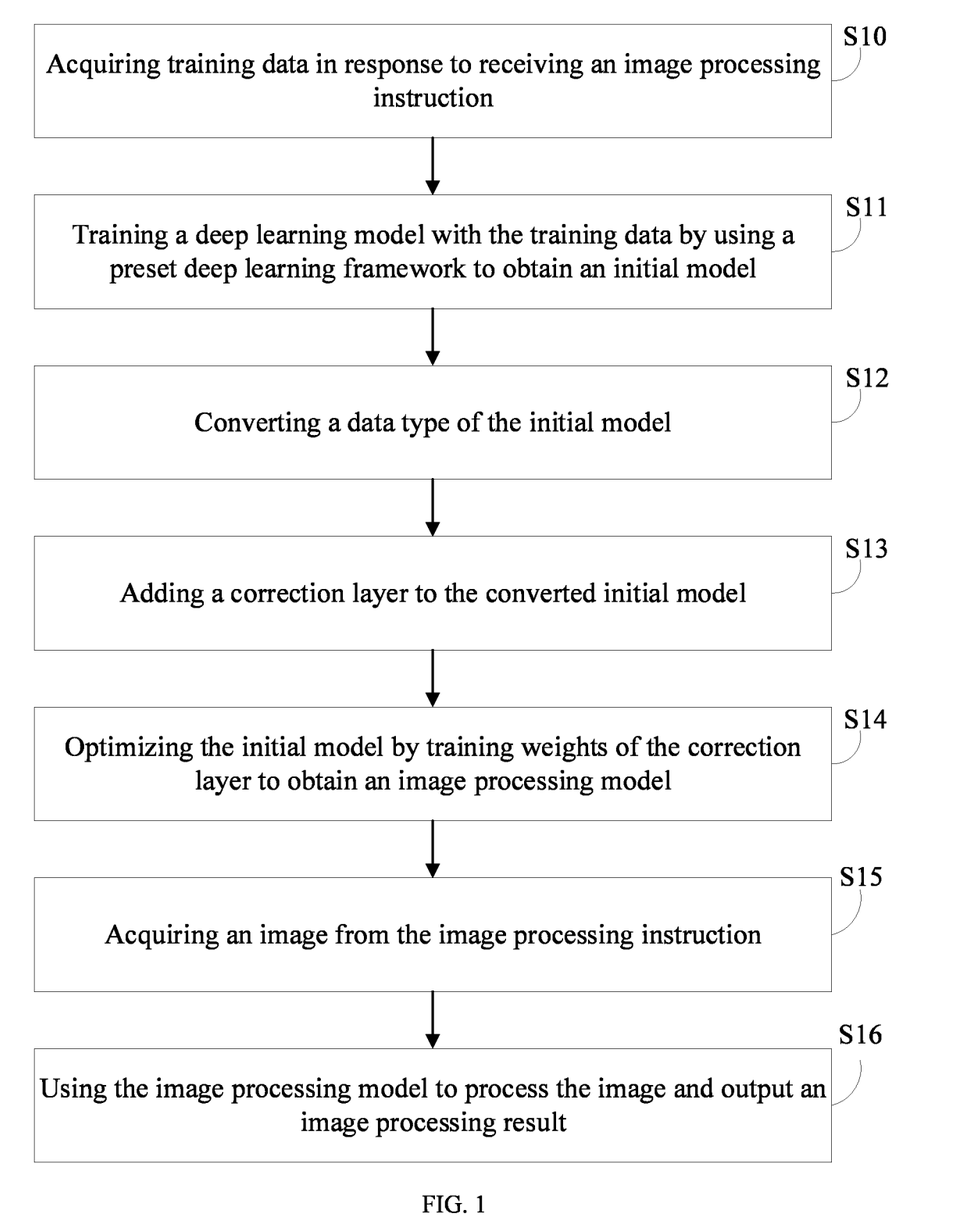
FIG. 1 shows a flowchart of an image processing method provided in an embodiment of the present disclosure.

FIG. 1 is a flowchart of an image processing method in an embodiment of the present disclosure. The image processing method is applied to electronic devices. According to different needs, the order of the steps in the flowchart can be changed, and some can be omitted.

In block S10: acquiring training data in response to receiving an image processing instruction.

The image processing instruction can be triggered by workers, and the present disclosure is not limited.

The training data may include image data, video data, and so on.

In block S11: training a deep learning model with the training data by using a preset deep learning framework to obtain an initial model.

The preset deep learning framework may include, but is not limited to: TensorFlow, Caffe (Convolutional Architecture for Fast Feature Embedding) architecture.

The Caffe architecture is a deep learning framework with expressiveness, speed and modularity of thinking, supporting multiple types of deep learning architectures, and is oriented to image classification and image segmentation.

Moreover, the original Caffe architecture only supports float (single-precision floating-point) data types and double (double-precision floating-point) data types.

In the above embodiment, the deep learning model may include any deep learning model supported by the Caffe architecture.

For example, the deep learning model can be CNN (Convolutional Neural Networks), RCNN (Regions with CNN features), LSTM (Long Short-Term Memory) and fully connected neural networks.

In block S12: converting a data type of the initial model.

The data type of the initial model is full precision type, and a data processing speed is relatively slow. To improve the data processing speed of the initial model, the data type must be converted.

In some embodiments, the method of converting a data type of the initial model includes: acquiring demand data from the image processing instruction; determining a target data type according to the demand data; converting a data type of the initial model into the target data type.

In some embodiments, the method of determining a target data type according to the demand data includes determining a required speed of data processing and a required accuracy according to the demand data.

In some embodiments, when the required speed of data processing is greater than or equal to a preset speed, it is determined that the target data type is int8.

A speed of data processing of the model with the int8 data type is higher than that of the model with the half-precision data type. Therefore, when a speed of data processing requirement is higher, that is, when the required speed of data processing is greater than or equal to the preset speed, the target data type may be determined as int8 in priority.

In some embodiments, the preset speed can be configured according to a speed that the model actually achievable, which is not limited in the present disclosure.

In some embodiments, when the required accuracy is greater than or equal to a preset accuracy, it is determined that the target data type is half-precision.

An accuracy of the model with the int8 data type is lower than that of the model with the half-precision data type. Therefore, when the accuracy requirement is higher, that is, when the required accuracy is greater than or equal to the preset accuracy, the target data type may be determined as half-precision in priority.

In some embodiments, the preset accuracy can be configured according to an accuracy that the model can achieve, which is not limited in the present disclosure.

In the above embodiments, after the data type is converted to int8 or half-precision, less memory is required by the entire network, bandwidth consumption is reduced, and a performance is also improved because a memory usage of each data type is reduced. Therefore, these two conversion modes can improve a data processing speed to a certain extent. However, because the processing speed and accuracy of the two data types are different, either of the two conversion modes can be selected according to different project or task requirements.

Of course, for other cases than the two conversion modes, one of the two conversion modes can be selected, or a default selection can be made according to the pre-configuration, the present disclosure is not herein limited.

In block S13, adding a correction layer to the converted initial model.

The correction layer may be any layer in a newly added initial model.

For example, the correction layer may be a newly-added convolutional layer, or may be a newly-added fully connected layer.

In block S14: optimizing the initial model by training weights of the correction layer to obtain an image processing model.

After converting the data type of the initial model, the accuracy of the initial model is reduced. To increase the data processing speed while ensuring the accuracy of the initial model, the initial model must be optimized.

In some embodiments, the method of optimizing the initial model by training weights of the correction layer to obtain an image processing model includes: training weights of the correction layer by fixing weights of each layer in the initial model; when an accuracy of the initial model is greater than or equal to a preset threshold, stopping the training to obtain the image processing model.

The preset threshold can be configured according to actual requirements to ensure that the accuracy of the model meets task requirements.

In some embodiments, the method of optimizing the initial model by training weights of the correction layer to obtain an image processing model also includes training the weights of the correction layer with full accuracy data type to obtain the image processing model.

By performing multiple operations on the correction layer with the full accuracy data type, the accuracy of the model is continuously improved, and the accuracy requirements are finally reached. Thereby, the optimized data processing speed and required accuracy are obtained while the requirements of the image processing model are met.

In some embodiments, the image processing method further includes: constructing a validation data set and verifying the image processing model with the validation data set.

In the above embodiments, the validation data set can be obtained from historical data, or can be provided internally, as long as reliability of the data is guaranteed. The present disclosure is not hereby limited.

Through the foregoing manner of implementation, the image processing model can be further verified to ensure the correctness and usability of the image processing model.

In block S15: acquiring an image from the image processing instruction.

The image acquired from the image processing instruction is an image to be processed. The image may be uploaded internally, or may be obtained through web crawler technology, not being limited.

In block S16: using the image processing model to process the image and output an image processing result.

For example, the image processing result may be an image classification result, or an image segmentation result.

It should be noted that, according to different image processing models obtained by different training procedures, the corresponding results will also be different, thereby satisfying various types of image processing tasks.

The present disclosure can acquire training data in response to receiving an image processing instruction, and train a deep learning model with the training data by using a preset deep learning framework to obtain an initial model. A data type of the initial model is converted to increase the data processing speed of the model. A correction layer is added to the converted initial model and the initial model is optimized by training weights of the correction layer to obtain an image processing model with higher data processing speed. After acquiring an image from the image processing instruction, the image processing model can be used to process the image and an image processing result can be outputted. The image is processed based on the optimized image processing model, which guarantees the data processing speed and accuracy.

Figure 2:
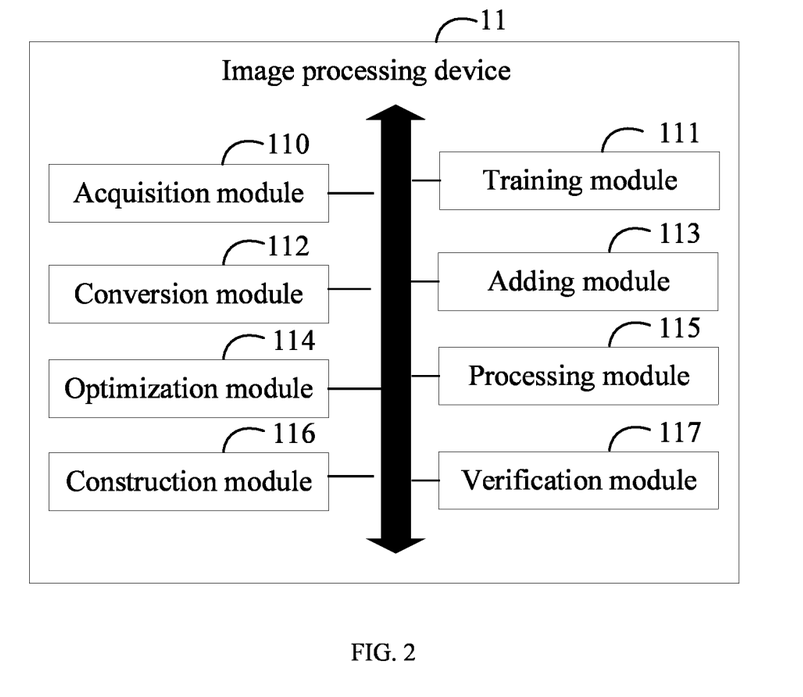
FIG. 2 shows a schematic structural diagram of an image recognition device provided in an embodiment of the present disclosure.

FIG. 2 shows a schematic structural diagram of an image recognition device provided in the embodiment of the present disclosure.

In some embodiments, the image processing device 11 runs in an electronic device. The image processing device 11 can include a plurality of function modules consisting of program code segments. The program code of each program code segments in the image processing device 11 can be stored in a memory and executed by at least one processor to perform image processing (described in detail in FIG. 2).

As shown in FIG. 2, the image processing device 11 can include: an acquisition module 110, a training module 111, a conversion module 112, an adding module 113, an optimization module 114, a processing module 115, a construction module 116, and a verification module 117. A module as referred to in the present disclosure refers to a series of computer-readable instruction segments that can be executed by at least one processor and that are capable of performing fixed functions, which are stored in a memory. In some embodiment, the functions of each module will be detailed.

The above-mentioned integrated unit implemented in a form of software functional modules can be stored in a non-transitory readable storage medium. The above software function modules are stored in a storage medium and includes several instructions for causing an electronic device (which can be a personal computer, a dual-screen device, or a network device) or a processor to execute the method described in various embodiments in the present disclosure.

The acquisition module 110 acquires training data in response to receiving an image processing instruction.

The image processing instruction can be triggered by workers, and the present disclosure is not limited.

The training data may include image data, video data, and so on.

The training module 111 trains a deep learning model with the training data by using a preset deep learning framework to obtain an initial model.

The preset deep learning framework may include, but is not limited to: TensorFlow, Caffe (Convolutional Architecture for Fast Feature Embedding) architecture.

The Caffe architecture is a deep learning framework with expressiveness, speed and modularity of thinking, supporting multiple types of deep learning architectures, and is oriented to image classification and image segmentation.

Moreover, the original Caffe architecture only supports float (single-precision floating-point) data types and double (double-precision floating-point) data types.

In the above embodiment, the deep learning model may include any deep learning model supported by the Caffe architecture.

For example, the deep learning model can be CNN (Convolutional Neural Networks), RCNN (Regions with CNN features), LSTM (Long Short-Term Memory) and fully connected neural networks.

The conversion module 112 converts a data type of the initial model.

The data type of the initial model is full precision type, and a data processing speed is relatively slow. To improve the data processing speed of the initial model, the data type must be converted.

In some embodiments, the conversion module 112 converting a data type of the initial model includes: acquiring demand data from the image processing instruction; determining a target data type according to the demand data; converting a data type of the initial model into the target data type.

In some embodiments, the conversion module 112 determining a target data type according to the demand data includes determining a required speed of data processing and a required accuracy according to the demand data.

In some embodiments, when the required speed of data processing is greater than or equal to a preset speed, the conversion module 112 determines that the target data type is int8.

A speed of data processing of the model with the int8 data type is higher than that of the model with the half-precision data type. Therefore, when a speed of data processing requirement is higher, that is, when the required speed of data processing is greater than or equal to the preset speed, the target data type may be determined as int8 in priority.

In some embodiments, the preset speed can be configured according to a speed that the model actually achievable, which is not limited in the present disclosure.

In some embodiments, when the required accuracy is greater than or equal to a preset accuracy, the conversion module 112 determines that the target data type is half-precision.

An accuracy of the model with the int8 data type is lower than that of the model with the half-precision data type. Therefore, when the accuracy requirement is higher, that is, when the required accuracy is greater than or equal to the preset accuracy, the target data type may be determined as half-precision in priority.

In some embodiments, the preset accuracy can be configured according to an accuracy that the model can actually achieve, which is not limited in the present disclosure.

In the above embodiments, after the data type is converted to int8 or half-precision, less memory is required by the entire network, bandwidth consumption is reduced, and a performance is also improved because a memory usage of each data type is reduced. Therefore, these two conversion modes can improve a data processing speed to a certain extent. However, because the processing speed and accuracy of the two data types are different, either of the two conversion modes can be selected according to different project or task requirements.

Of course, for other cases than the two conversion modes, one of the two conversion modes can be selected, or a default selection can be made according to the pre-configuration, the present disclosure is not herein limited.

The adding module 113 adds a correction layer to the converted initial model.

The correction layer may be any layer in a newly added initial model.

For example, the correction layer may be a newly-added convolutional layer, or may be a newly-added fully connected layer.

The optimization module 114 optimizes the initial model by training weights of the correction layer to obtain an image processing model.

After converting the data type of the initial model, the accuracy of the initial model is reduced. To increase the data processing speed while ensuring the accuracy of the initial model, the initial model must be optimized.

In some embodiments, the method of optimizing the initial model by training weights of the correction layer to obtain an image processing model includes: training weights of the correction layer by fixing weights of each layer in the initial model; when an accuracy of the initial model is greater than or equal to a preset threshold, stopping the training to obtain the image processing model.

The preset threshold can be configured according to actual requirements to ensure that the accuracy of the model meets task requirements.

In some embodiments, the optimization module 114 optimizing the initial model by training weights of the correction layer to obtain an image processing model also includes training the weights of the correction layer with full accuracy data type to obtain the image processing model.

By performing multiple operations on the correction layer with the full accuracy data type, the accuracy of the model is continuously improved, and the accuracy requirements are finally reached. Thereby, the optimized data processing speed and required accuracy are obtained while the requirements of the image processing model are met.

The construction module 116 constructs a validation data set.

The verification module 117 verifies the image processing model with the validation data set.

In the above embodiments, the validation data set can be obtained from historical data, or can be provided internally, as long as a reliability of the data is guaranteed. The present disclosure is not hereby limited.

Through the foregoing manner of implementation, the image processing model can be further verified to ensure the correctness and usability of the image processing model.

The acquisition module 110 acquires an image from the image processing instruction.

The image acquired from the image processing instruction is an image to be processed. The image may be uploaded internally, or may be obtained through web crawler technology, not being limited.

The processing module 115 uses the image processing model to process the image and output an image processing result.

For example, the image processing result may be an image classification result, or an image segmentation result.

It should be noted that, according to different image processing models obtained by different training procedures, the corresponding results will also be different, thereby satisfying various types of image processing tasks.

The present disclosure can acquire training data in response to receiving an image processing instruction, and train a deep learning model with the training data by using a preset deep learning framework to obtain an initial model. A data type of the initial model is converted to increase the data processing speed of the model. A correction layer is added to the converted initial model and the initial model is optimized by training weights of the correction layer to obtain an image processing model with higher data processing speed. After acquiring an image from the image processing instruction, the image processing model can be used to process the image and an image processing result can be outputted. The image is processed based on the optimized image processing model, which guarantees the data processing speed and accuracy.

The embodiment also provides a non-transitory readable storage medium having computer-readable instructions stored therein. The computer-readable instructions are executed by a processor to implement the steps in the above-mentioned image processing method, such as in steps in blocks S10-S16 shown in FIG. 1:

In block S10: Acquiring training data in response to receiving an image processing instruction;

In block S11: Training a deep learning model with the training data by using a preset deep learning framework to obtain an initial model;

In block S12: Converting a data type of the initial model;

In block S13, Adding a correction layer to the converted initial model;

In block S14: Optimizing the initial model by training weights of the correction layer to obtain an image processing model;

In block S15: Acquiring an image from the image processing instruction;

In block S16: Using the image processing model to process the image and output an image processing result.

The computer-readable instructions are executed by the processor to realize the functions of each module/unit in the above-mentioned device embodiments, such as the modules 110-117 in FIG. 2:

The acquisition module 110 acquires training data in response to receiving an image processing instruction;

The training module 111 trains a deep learning model with the training data by using a preset deep learning framework to obtain an initial model;

The conversion module 112 converts a data type of the initial model;

The adding module 113 adds a correction layer to the converted initial model;

The optimization module 114 optimizes the initial model by training weights of the correction layer to obtain an image processing model;

The processing module 115 uses the image processing model to process the image and output an image processing result;

The construction module 116 constructs a validation data set;

The verification module 117 verifies the image processing model with the validation data set.

Figure 3:
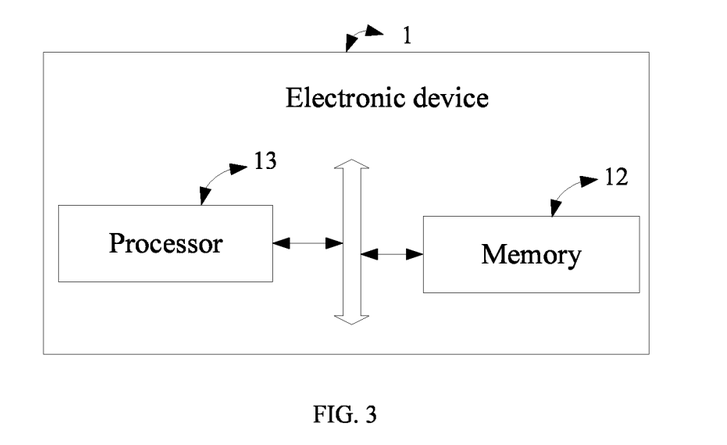
FIG. 3 shows a schematic structural diagram of an electronic device provided in an embodiment of the present disclosure.

FIG. 3 is a schematic structural diagram of an electronic device provided in an embodiment of the present disclosure. The electronic device 1 may include: a memory 12, at least one processor 13, and computer-readable instructions stored in the memory 12 and executable on the at least one processor 13, for example, image recognition programs. The processor 13 executes the computer-readable instructions to implement the steps in the embodiment of the image processing method, such as in steps in block S10-S16 shown in FIG. 1. Alternatively, the processor 13 executes the computer-readable instructions to implement the functions of the modules/units in the foregoing device embodiments, such as the modules 110-117 in FIG. 2.

For example, the computer-readable instructions can be divided into one or more modules/units, and the one or more modules/units are stored in the memory 12 and executed by the at least one processor 13. The one or more modules/units can be a series of computer-readable instruction segments capable of performing specific functions, and the instruction segments are used to describe execution processes of the computer-readable instructions in the electronic device 1. For example, the computer-readable instruction can be divided into the acquisition module 110, the training module 111, the conversion module 112, the adding module 113, the optimization module 114, the processing module 115, the construction module 116, and the verification module 117 as in FIG. 2.

The electronic device 1 can be an electronic device such as a desktop computer, a notebook, a palmtop computer, and a cloud server. Those skilled in the art will understand that the schematic diagram 3 is only an example of the electronic device 1 and does not constitute a limitation on the electronic device 1. Another electronic device 1 may include more or fewer components than shown in the figures or may combine some components or have different components. For example, the electronic device 1 may further include an input/output device, a network access device, a bus, and the like.

The at least one processor 13 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 13 can be a microprocessor or any conventional processor. The processor 13 is a control center of the electronic device 1 and connects various parts of the entire electronic device 1 by using various interfaces and lines.

The memory 12 can be configured to store the computer-readable instructions and/or modules/units. The processor 13 may run or execute the computer-readable instructions and/or modules/units stored in the memory 12 and may call up data stored in the memory 12 to implement various functions of the electronic device 1. The memory 12 mainly includes a storage program area and a storage data area. The storage program area may store an operating system, and an application program required for at least one function (such as a sound playback function, an image playback function, etc.), etc. The storage data area may store data (such as audio data, phone book data, etc.) created according to the use of the electronic device 1. In addition, the memory 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the electronic device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset application, the disclosed electronic device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. An image processing method, comprising:
   acquiring training data in response to receiving an image processing instruction;
   training a deep learning model with the training data by using a preset deep learning framework to obtain an initial model, wherein the preset deep learning framework comprises Caffe (Convolutional Architecture for Fast Feature Embedding) architecture;
   converting a data type of the initial model, comprising: acquiring demand data from the image processing instruction; determining a target data type according to the demand data; and converting a data type of the initial model into the target data type; wherein the determining the target data type according to the demand data comprises: determining a required speed of data processing and a required accuracy according to the demand data; determining that the target data type is int8, if the required speed of data processing is greater than or equal to a preset speed; and determining that the target data type is a half-precision, if the required accuracy is greater than or equal to a preset accuracy;
   adding a correction layer to the initial model that has been converted;
   optimizing the initial model by training weights of the correction layer with full-precision data type to obtain an image processing model;
   acquiring an image from the image processing instruction; and
   using the image processing model to process the image and output an image processing result.

2. The image processing method of claim 1, wherein a speed of data processing of the model with the int8 data type is higher than that of the model with the half-precision data type, and an accuracy of the model with the int8 data type is lower than that of the model with the half-precision data type.

3. The image processing method of claim 1, wherein optimizing the initial model by training weights of the correction layer to obtain an image processing model comprises:
   training weights of the correction layer by fixing weights of each layer in the initial model; and
   if an accuracy of the initial model is greater than or equal to a preset threshold, stopping the training to obtain the image processing model.

4. The image processing method according to claim 1, further comprising:
   constructing a validation data set; and
   verifying the image processing model with the validation data set.

5. A electronic device comprising a memory and a processor, the memory stores at least one computer-readable instruction, and the processor executes the at least one computer-readable instruction to:
   acquire training data in response to receiving an image processing instruction;
   train a deep learning model with the training data by using a preset deep learning framework to obtain an initial model, wherein the preset deep learning framework comprises Caffe (Convolutional Architecture for Fast Feature Embedding) architecture;
   convert a data type of the initial model, comprising: acquire demand data from the image processing instruction; determine a target data type according to the demand data; and convert a data type of the initial model into the target data type; wherein the determine the target data type according to the demand data comprises: determine a required speed of data processing and a required accuracy according to the demand data; determine that the target data type is int8, if the required speed of data processing is greater than or equal to a preset speed; and determine that the target data type is a half-precision, if the required accuracy is greater than or equal to a preset accuracy;
   add a correction layer to the initial model that has been converted;
   optimize the initial model by training weights of the correction layer with full-precision data type to obtain an image processing model;
   acquire an image from the image processing instruction; and
   use the image processing model to process the image and output an image processing result.

6. The electronic device according to claim 5, wherein a speed of data processing of the model with the int8 data type is higher than that of the model with the half-precision data type, and an accuracy of the model with the int8 data type is lower than that of the model with the half-precision data type.

7. The electronic device according to claim 5, wherein the processor optimizing the initial model by training weights of the correction layer to obtain an image processing model by:
   training weights of the correction layer by fixing weights of each layer in the initial model; and
   in response that an accuracy of the initial model is greater than or equal to a preset threshold, stopping the training to obtain the image processing model.

8. The electronic device according to claim 5, wherein the processor is further caused to:
   construct a validation data set; and
   verify the image processing model with the validation data set.

9. A non-transitory storage medium having stored thereon at least one computer-readable instructions that, when the at least one computer-readable instructions are executed by a processor to implement the following steps:
   acquiring training data in response to receiving an image processing instruction;
   training a deep learning model with the training data by using a preset deep learning framework to obtain an initial model, wherein the preset deep learning framework comprises Caffe (Convolutional Architecture for Fast Feature Embedding) architecture;
   converting a data type of the initial model, comprising: acquiring demand data from the image processing instruction; determining a target data type according to the demand data; and converting a data type of the initial model into the target data type; wherein the determining the target data type according to the demand data comprises: determining a required speed of data processing and a required accuracy according to the demand data; determining that the target data type is int8, if the required speed of data processing is greater than or equal to a preset speed; and determining that the target data type is a half-precision, if the required accuracy is greater than or equal to a preset accuracy;

adding a correction layer to the initial model that has been converted;

optimizing the initial model by training weights of the correction layer with full-precision data type to obtain an image processing model;

acquiring an image from the image processing instruction; and using the image processing model to process the image and output an image processing result.

10. The non-transitory storage medium according to claim 9, wherein a speed of data processing of the model with the int8 data type is higher than that of the model with the half-precision data type, and an accuracy of the model with the int8 data type is lower than that of the model with the half-precision data type.

11. The non-transitory storage medium according to claim 9, wherein optimizing the initial model by training weights of the correction layer to obtain an image processing model comprises:

training weights of the correction layer by fixing weights of each layer in the initial model;

when an accuracy of the initial model is greater than or equal to a preset threshold, stopping the training to obtain the image processing model.

* * * * *